(12) United States Patent
Barnhill

(10) Patent No.: US 12,160,091 B2
(45) Date of Patent: Dec. 3, 2024

(54) STRINGING BLOCK SYSTEM

(71) Applicant: BTI Inc., Santee, CA (US)

(72) Inventor: Todd Barnhill, Santee, CA (US)

(73) Assignee: BTI Inc., Santee, CA (US)

( * ) Notice: Subject to any disclaimer, the term of this patent is extended or adjusted under 35 U.S.C. 154(b) by 462 days.

(21) Appl. No.: 17/586,281

(22) Filed: Jan. 27, 2022

(65) Prior Publication Data
US 2022/0239077 A1    Jul. 28, 2022

Related U.S. Application Data

(60) Provisional application No. 63/142,600, filed on Jan. 28, 2021.

(51) Int. Cl.
*H02G 1/00* (2006.01)
*H02G 1/04* (2006.01)

(52) U.S. Cl.
CPC ..................... *H02G 1/04* (2013.01)

(58) Field of Classification Search
CPC ........................................ H02G 1/04
See application file for complete search history.

(56) References Cited

U.S. PATENT DOCUMENTS

| | | | | |
|---|---|---|---|---|
| 4,632,364 | A * | 12/1986 | Smith | H02G 1/04 254/405 |
| 5,064,172 | A * | 11/1991 | Hereford | H02G 1/04 254/134.3 PA |
| 5,735,505 | A * | 4/1998 | Walton | G02B 6/4465 254/134.3 PA |
| 6,517,052 | B1 * | 2/2003 | Lake | H02G 1/06 254/134.3 R |
| 8,046,888 | B2 * | 11/2011 | Williams | H02G 7/20 29/270 |
| 2014/0367623 | A1 * | 12/2014 | Jean | H02G 1/04 254/134.3 PA |
| 2017/0229848 | A1 * | 8/2017 | Barnhill | H02G 1/04 |
| 2022/0239077 | A1 * | 7/2022 | Barnhill | H02G 1/04 |

* cited by examiner

*Primary Examiner* — Lee D Wilson
(74) *Attorney, Agent, or Firm* — CP LAW GROUP PC; Cy Bates

(57) ABSTRACT

A stringing block system is disclosed. The stringing block system includes a plurality of plates forming a housing coupled to a base, at least one sheave coupled to the housing, and a side gate. In some embodiments, the base is an adjustable base configured to rotate the stringing block system forward or backward such that one or more sheaves will form an angle with the respect to a ground surface. A desired angle can easily be achieved to create proper alignment with a successive structure. The adjustable base is structured such that rotating the stringing block system does not require disengaging the entire system from a structure. In some embodiments, the stringing block system includes an extendable guide arm coupled to the housing, which provides a greater area for a helicopter pilot to work with when lowering a wire onto the stringing block system.

18 Claims, 12 Drawing Sheets

STRINGING BLOCK SYSTEM

BACKGROUND

Field of the Invention

This disclosure relates to devices for guiding utility cables during installation, and more particularly to a stringing block system for guiding installation of utility cables for mounting upon a structure.

Description of the Related Art

Use of helicopters to install utility cables upon new towers and utility poles (collectively "structures") or to modify existing structures is common practice in the industry. Benefits of using helicopters include efficiency and lessening the environmental impact. Generally, linemen are deployed high above the ground to guide the wire to a desired location atop the structures. Use of linemen in such a way increases safety risks and labor cost. Even when linemen are not deployed, helicopter pilots have to perform difficult and dangerous maneuvers to place the wire at the desired locations Patent Application US 2017/0229848 titled "WIRE GUIDE ASSMEBLY" disclosed by Barnhill solved some of these problems by adding a catch arm to catch a wire from a helicopter. However, the stringing block assembly disclosed in US 2017/0229848 still has shortcomings. For example, and without limitation, helicopter pilots still have difficulty lowering the wire onto the catch arm. Additionally, rotating the entire stringing block assembly such that the assembly is in alignment with a successive structure is challenging and requires removing the entire assembly, sometimes weighing more than 40 lbs., from the structure and then reattaching. Furthermore, the stringing block assembly in 2017/0229848 has issues related to durability wherein the one or more sheaves are prone to damage while the stringing block assembly is being transported.

There is a need for a stringing block system that can solve the shortcomings of the current state of the art.

SUMMARY

A stringing block system is disclosed. The stringing block system comprises a plurality of plates forming a housing coupled to a base, at least one sheave coupled to the housing, and a side gate.

In some embodiments, an extendable guide arm is coupled to the housing. The extendable guide arm comprises an inner tube and an outer tube such that the extendable guide arm is capable of extending to a greater length. An extension of the extendable guide arm provides a greater area for a helicopter pilot to work with when lowering a wire onto the stringing block system.

In some embodiments, the base is an adjustable base configured to rotate the stringing block system forward or backward such that one or more sheaves will form an angle with the respect to a ground surface. A desired angle can easily be achieved to create proper alignment with a successive structure. The adjustable base is structured such that rotating the stringing block system does not require disengaging the entire system from a structure.

In some embodiments, features are added to the housing including flanges and increased periphery of mounting plates such that the one or more sheaves are protected from damage.

BRIEF DESCRIPTION OF THE DRAWINGS

These and other features of the invention will become apparent to one having the ordinary level of skill in the art upon a thorough review of the following details and descriptions, particularly when reviewed in conjunction with the drawings, wherein.

DETAILED DESCRIPTION OF EMBODIMENTS

Figure 1:
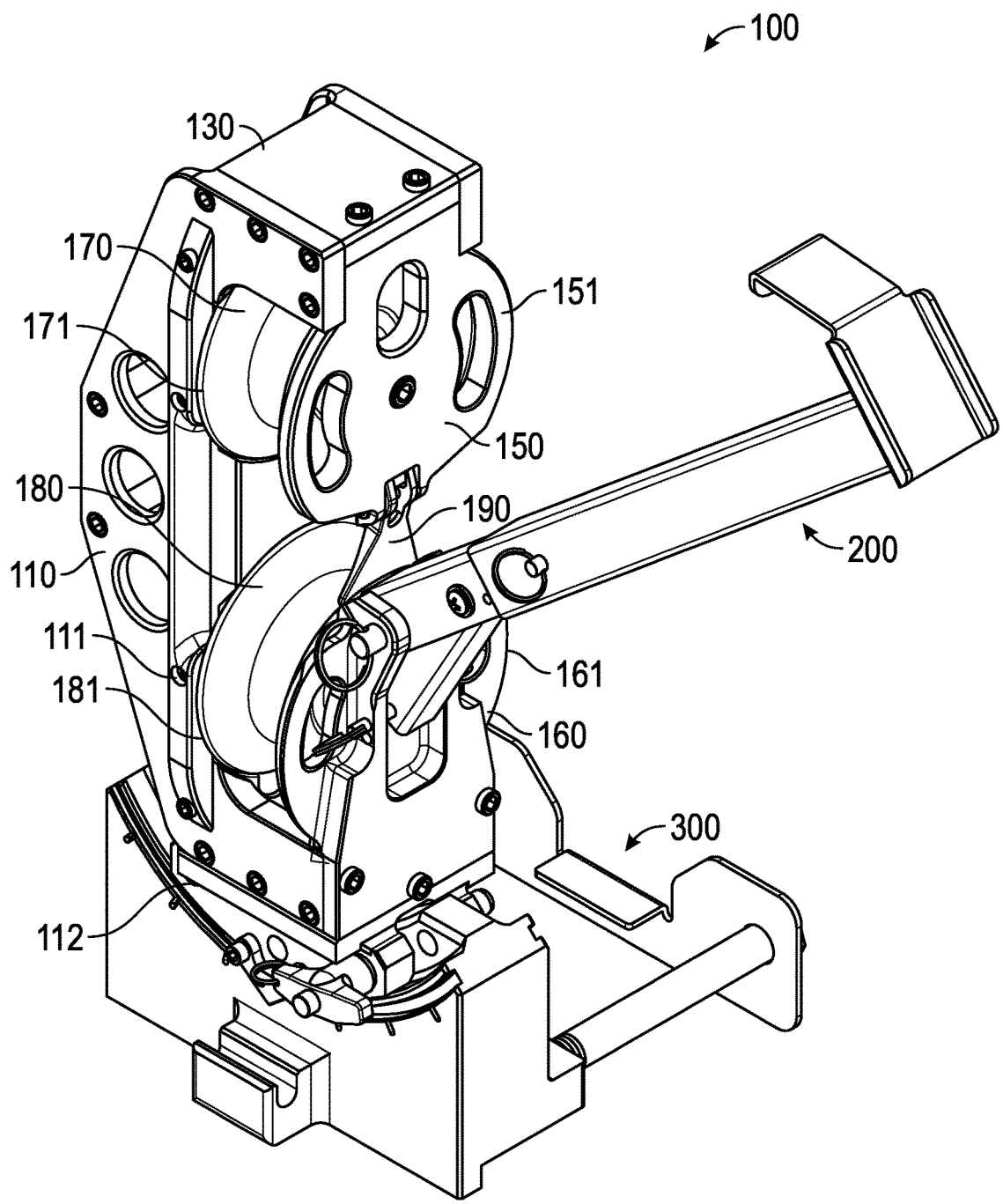
FIG. 1 shows a perspective view of a stringing block system according to a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, reference numbers are provided in the drawings for illustrating certain features of embodiments. Where distinct figures of the drawings utilize a shared reference number, it can be appreciated that the feature corresponding to the shared reference number is the same or similar, perhaps observed from a different view, or observed with respect to a different embodiment deploying the same or similar feature.

For purposes herein, the term "sheave" means a grooved apparatus used for holding belt, wire, rope, and other similar materials.

The term "periphery" means outer limits or edge of an area or object.

Unless explicitly defined herein, terms are to be construed in accordance with the plain and ordinary meaning as would be appreciated by one having skill in the art.

General Description of Embodiments

In a first embodiment, a stringing block system is disclosed. The stringing block system comprises a plurality of plates coupled together to form a housing, the housing including an upper mounting plate and a lower mounting plate, an upper sheave rotationally coupled to the upper mounting plate, the upper sheave having an upper sheave periphery, and a lower sheave rotationally coupled to the lower mounting plate, the lower sheave having a lower sheave periphery. The stringing block system further comprises a side gate pivotally coupled to the housing configured to pivot towards the upper sheave, an extendable guide arm coupled to the housing, the extendable guide arm comprising an outer tube and an inner tube wherein the inner tube is configured to nest with the outer tube, and an adjustable base comprising a mount bracket, a clamp, and a plurality of fasteners disposed therebetween. The mount bracket comprises a first side, a second side opposite the first side, and a top portion, a saddle mount disposed at the top portion, the saddle mount having one or more base apertures, a lock slot disposed on each of the first side and the second side, the lock slot being charectered as a curved path, a plurality of indicia disposed on the first side, and a ratchet strap attachment coupled to the first side.

In the first embodiment, the stringing block system further comprises a left pivot saddle coupled to the housing, the left pivot saddle having a plurality of left pivot saddle apertures, a right pivot saddle coupled to the housing, the right pivot saddle having a plurality of right pivot saddle apertures, a left pivot guide coupled to the left pivot saddle, the left pivot guide further comprising a left stepped portion wherein the left stepped portion engages with the lock slot, a right pivot guide coupled to the right pivot saddle, the right pivot guide further comprising a right stepped portion wherein the right stepped portion engages with the lock slot and a lock pin configured to be inserted collectively through one of the one or more base apertures, one of the plurality of left pivot saddle apertures, and one of the plurality of right pivot saddle apertures. The left and right pivot saddles are configured to rotatably couple with the mount bracket.

In some embodiments, the upper mounting plate may further comprise an upper an upper mounting periphery wherein the upper mounting periphery is greater than the upper sheave periphery.

In some embodiments, the lower mounting plate may further comprise a lower mounting periphery wherein the lower mounting periphery is greater than the lower sheave periphery.

In some embodiments, the housing may further comprise a left housing plate, and a right housing plate oriented parallel with the left housing plate and spaced apart therefrom. A left flange is coupled to the left housing plate, and a right flange coupled to the right housing plate, wherein the left and right flanges are configured to protect the upper sheave.

In a second embodiment, a stringing block system is disclosed. The stringing block system comprises a plurality of plates coupled together to form a housing, an upper sheave rotationally coupled to the housing, the upper sheave having an upper sheave periphery, a side gate pivotally coupled to the housing, the side gate being configured to pivot towards the upper sheave, and an adjustable base, wherein the housing is rotatably coupled to the adjustable base.

In some embodiments, the system may further comprise an extendable guide arm coupled to the housing. The extendable guide arm may comprise an outer tube and an inner tube wherein the inner tube is configured to nest within the outer tube.

In some embodiments, the housing may further comprise an upper mounting plate coupled to the upper sheave, the upper mounting plate comprising an upper mounting periphery wherein the upper mounting periphery is greater than the upper sheave periphery.

In some embodiments, the system may further comprise a lower sheave having a lower sheave periphery disposed below the upper sheave, wherein the lower sheave is rotationally coupled to the housing. The housing may further comprise a lower mounting plate coupled to the lower sheave, the lower mounting plate comprising a lower mounting periphery wherein the lower mounting periphery is greater than the lower sheave periphery.

In some embodiments, the housing may further comprise a left housing plate, a right housing plate oriented parallel with the left housing plate and spaced apart therefrom. A left flange is coupled to the left housing plate, and a right flange coupled to the right housing plate. The left and right flanges are configured to protect the upper sheave.

In some embodiments, the adjustable base may further comprise a mount bracket, a clamp plate, and a plurality of fasteners disposed therebetween.

In some embodiments, the adjustable base may further comprise a lock slot, the lock slot characterized as having a curved path.

In some embodiments, the adjustable base may further comprise a plurality of angle of indicia.

In some embodiments, the adjustable base may further comprise a saddle mount, the saddle mount having one or more base apertures.

In some embodiments, the system may further comprise a left pivot saddle and a right pivot saddle. The left pivot saddle includes a plurality of left pivot saddle apertures, the left pivot saddle being coupled to the housing. The right pivot saddle includes a plurality of right pivot saddle apertures, the right pivot saddle being coupled to the housing. The left and right pivot saddles are configured to rotatably couple with the adjustable base. The system may further comprise a lock pin configured to be inserted collectively through one of the one or more base apertures, one of the plurality of left pivot saddle apertures, and one of the plurality of right pivot saddle apertures.

In some embodiments, the stringing block system may further comprise a left pivot guide coupled to the left pivot saddle, and a right pivot guide coupled to the right pivot saddle, wherein the right and left pivot guides are configured to slideably engage with a lock slot. A left stepped portion may be disposed on the left pivot guide, and a right stepped portion may be disposed on the right pivot guide, wherein the right and left stepped portions are configured to prevent the housing from decoupling from the adjustable base.

In one aspect, a method of adjusting a stringing block system is disclosed. The aspect includes mounting the stringing block system to a tower, the stringing block system comprising a housing rotatably coupled to an adjustable base, removing a lock pin from the adjustable base, rotating the housing to a desired angle, and inserting the lock pin into the adjustable base.

Illustrated Embodiments

Now turning to the drawings, FIG. 1 shows a perspective view of a stringing block system (100) according to a first illustrated embodiment. The stringing block system comprises a plurality of plates forming a housing, an upper sheave (170), a lower sheave (180), an extendable guide arm (200), and an adjustable base (300). The housing comprises a left housing plate (110), a right housing plate (not shown), a top housing plate (130), a rear housing plate (not shown), an upper mounting plate (150), and a lower mounting plate (160). The housing further comprises a left flange (111) and a right flange (not shown) to provide protection to the upper and lower sheaves from external forces. Coupled to the housing includes a left pivot saddle (112) and a right pivot saddle (not shown), wherein the left and right pivot saddles are configured to couple to the adjustable base such that the stringing block system is capable of angling forwards or backwards with respect to a ground surface.

The upper mounting plate (150) having an upper mounting plate periphery (151) is coupled to the upper sheave (170) having an upper sheave periphery (171) associated therewith. The upper mounting plate periphery is configured to be larger than the upper sheave periphery such that the upper sheave has protection from sideways damage.

The lower mounting plate (160) having a lower mounting plate periphery (161) is coupled to the lower sheave (180) having a lower sheave periphery (181) associated therewith. The lower mounting plate periphery is configured to be larger than the lower sheave periphery such that the lower sheave has protection from sideways damage.

As shown in a preferable embodiment, the upper sheave (170) and lower sheave (180) are identical. In other embodiments, the sheaves may different in radii and/or thickness.

A side gate (190) is pivotally coupled to the upper mounting plate (150). In other embodiments, the side gate can be pivotally coupled to the lower mounting plate (160). When a wire from a helicopter engages with the guide arm (200), the wire is guided down towards the side gate where the side gate pivots inward to allow the wire within the stringing block system (100). Upon the wire fully passing through the side gate, the side gate is configured to retract back into a home position, thereby preventing the wire from escaping. A terminal end of the side gate is configured to abut against the lower sheave (180) or the lower mounting plate when in the home position to prevent the side gate from opening and allowing the wire to escape. In other embodiments, the side gate is pivotally coupled to the upper mounting plate by a coupler such that coupler is configured to only rotate in one direction.

The left flange (111) is shown with a tapered formation. The tapered formation assists in the guidance of a bullet, or swivel, from passing through the upper and lower sheaves (170; 180).

Figure 2:
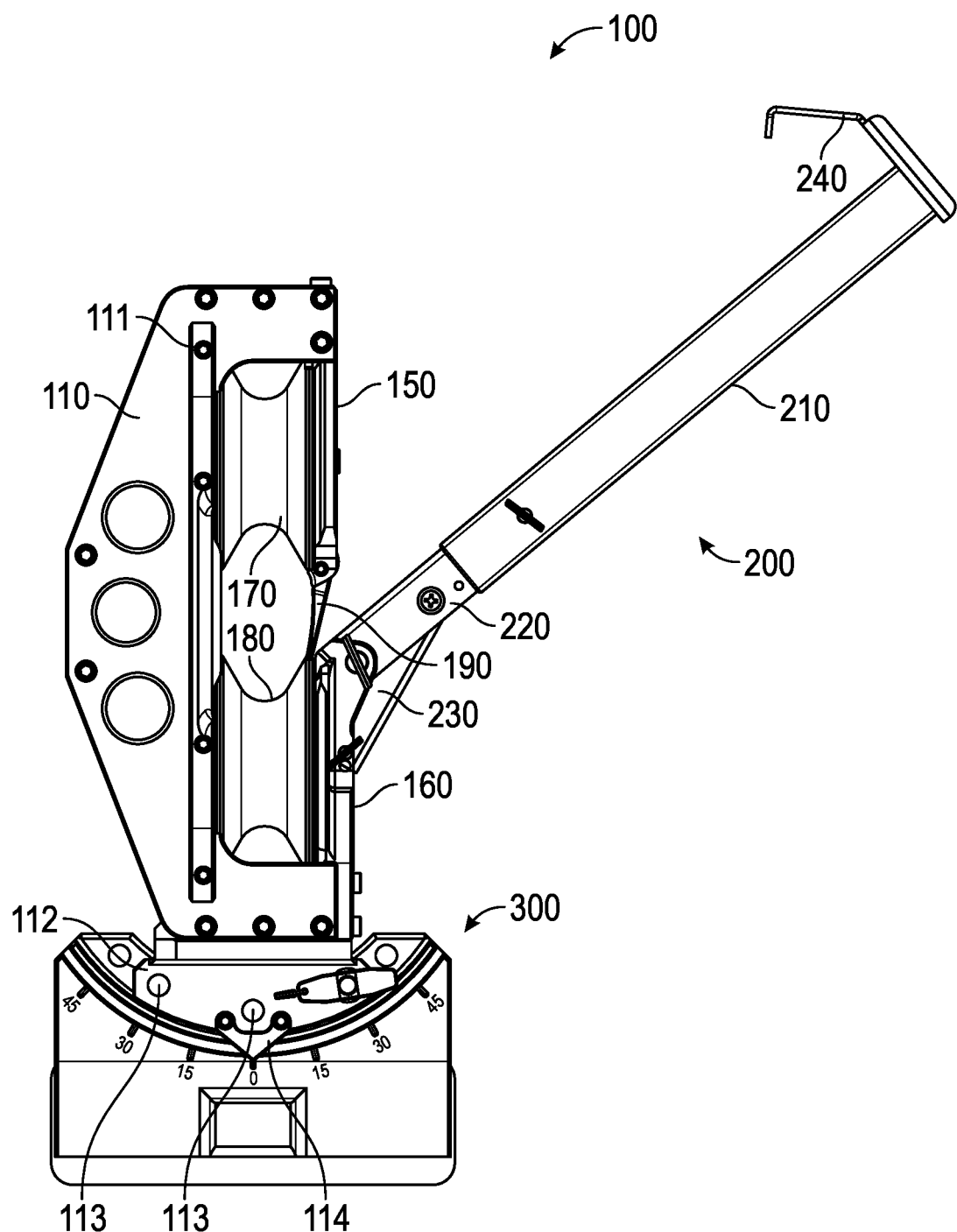
FIG. 2 shows a left view of the stringing block system according to the first illustrated embodiment.

FIG. 2 shows a left view of the stringing block system (100) according to the first illustrated embodiment. The stringing block system includes a guide arm (200) and an adjustable base (300). Coupled to the adjustable base is a left pivot straddle (112), the left pivot straddle having a left pivot guide (114) and one or more left pivot straddle apertures (113). The guide arm further comprises an outer tube (210), and inner tube (220), a guide arm support (230), and a catch arm hook (240). The stringing block system comprises two sheaves, namely, a sheave (170) and a lower sheave (180). In some embodiments, the stringing block system comprises a single sheave, namely the upper sheave.

A left mounting plate (110) is coupled to the left pivot straddle (112). An upper mounting plate (150) and a lower mounting plate (160) are both coupled to the left mounting plate. The upper sheave (170) is coupled to the upper mounting plate and is configured to rotate. The lower sheave (180) is coupled to the lower mounting plate and is also configured to rotate.

Figure 3:
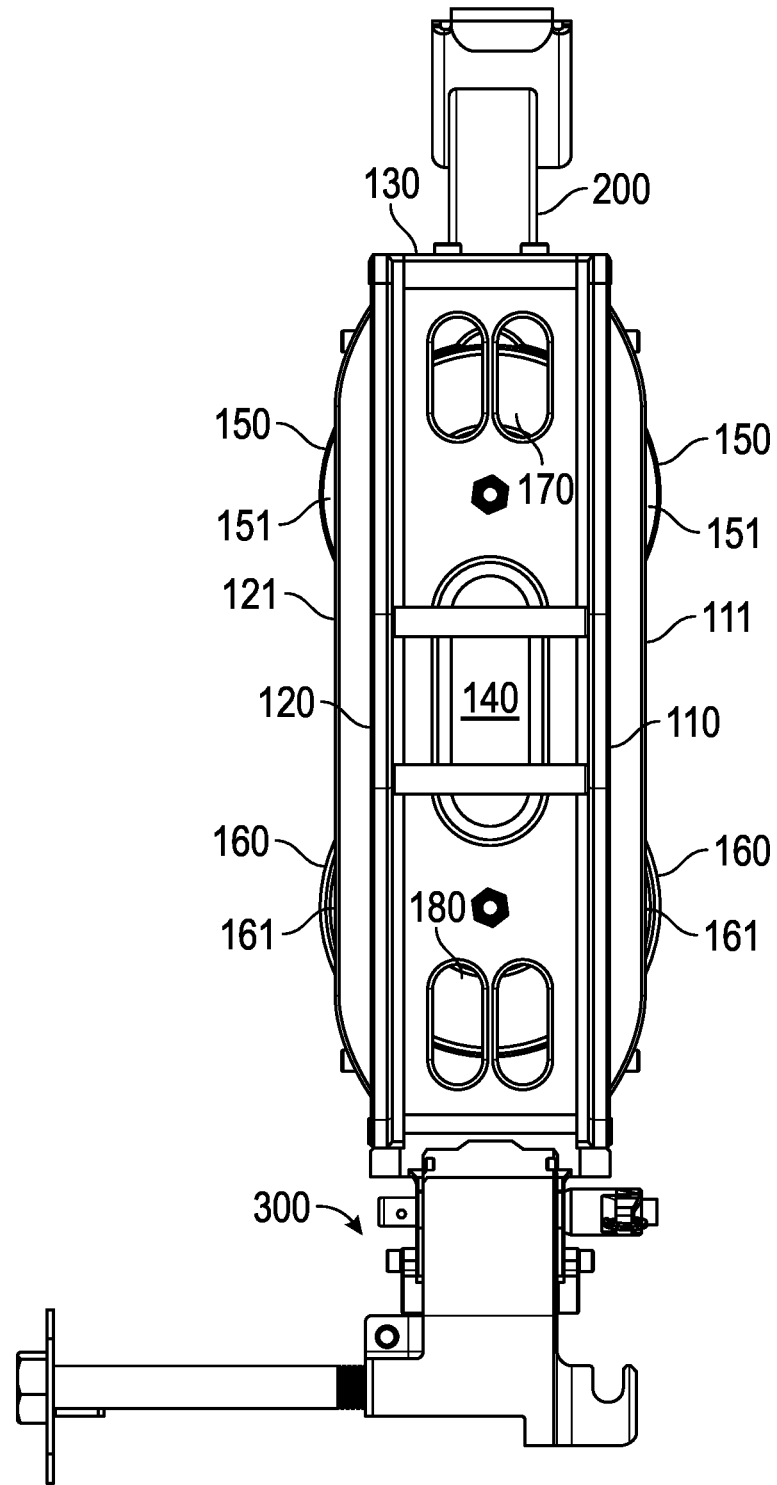
FIG. 3 shows a rear view of the stringing block system according to the first illustrated embodiment.

FIG. 3 shows a rear view of the stringing block system (100) according to the first illustrated embodiment. The stringing block system includes a guide arm (200), and adjustable base (300), a top mounting plate (130) and a rear mounting plate (140). The stringing block system further comprises a left mounting plate (110), a right mounting plate (120), a left flange (111), and a right flange (121). Portions of an upper mounting plate (150) and lower mounting plate (160) can be seen. Through optional apertures of the rear mounting plate shows an upper sheave (170) and a lower sheave (180). The upper and lower sheaves are rotationally coupled to eh rear mounting plate.

The left flange (111) and right flange (121) are structured in such a way that an upper sheave periphery and lower sheave periphery are not viewable in the present view. This was done intentionally so as to provide protection to the upper and lower sheaves from outside, sideways forces. As shown, an upper mounting plate periphery (151) and a lower mounting plate periphery (161) each extend further outward than the left and right flange.

Figure 4:
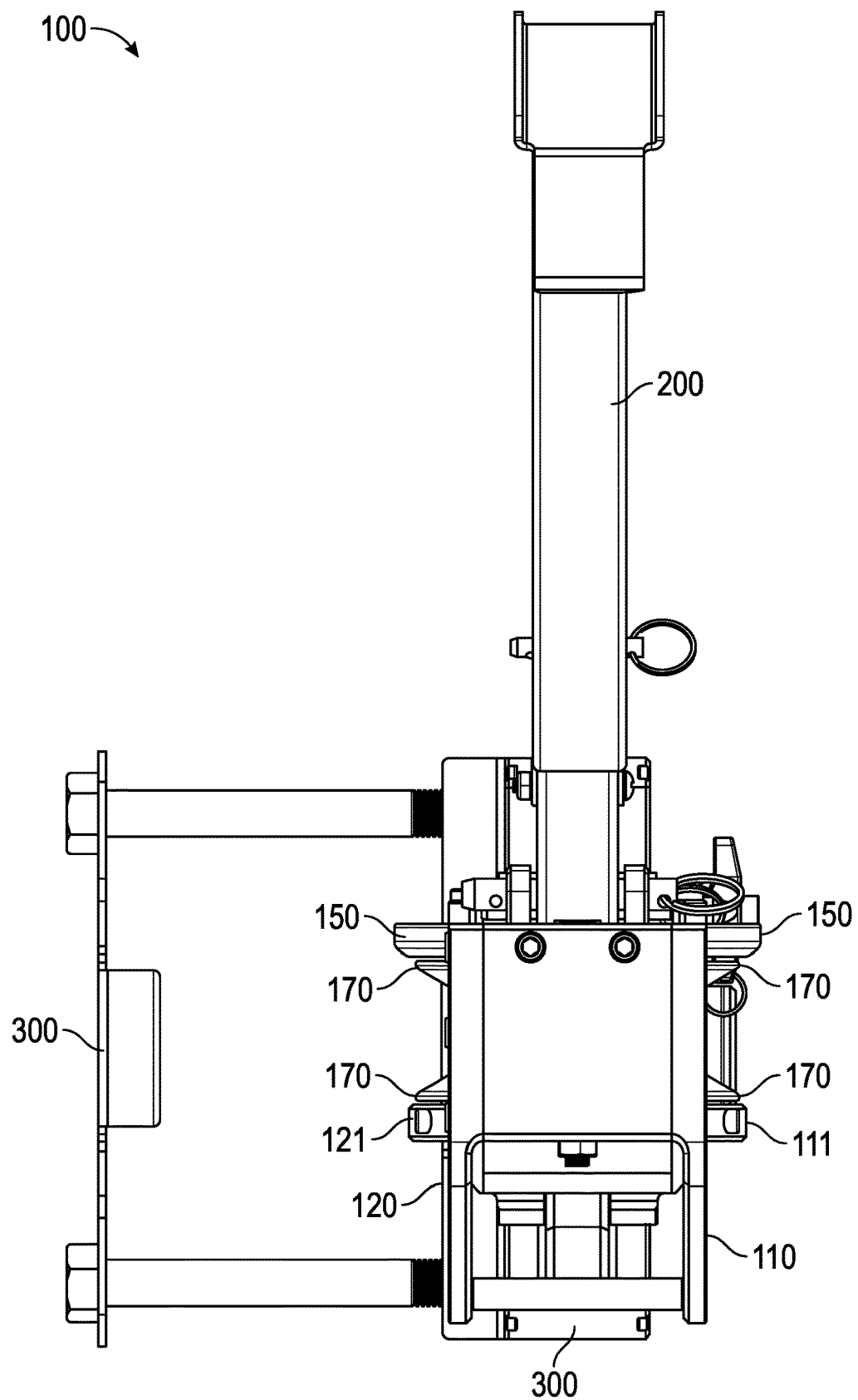
FIG. 4 shows a top view of the stringing block system according to the first illustrated embodiment.

FIG. 4 shows a top view of the stringing block system (100) according to the first illustrated embodiment. The stringing block system comprises a guide arm (200) and an adjustable base (300). The stringing block system further comprises a left mounting plate (110), a right mounting plate (120), and a top mounting plate (130). Coupled to both the left and right mounting plates is an upper mounting plate (150). A left flange (111) and right flange (121) are coupled to the left mounting plate and right mounting plate respectively. As shown, the upper mounting plate, the left flange, and the right flange each extend outward more than the upper sheave, thus providing protection from incidental damage.

Figure 5:
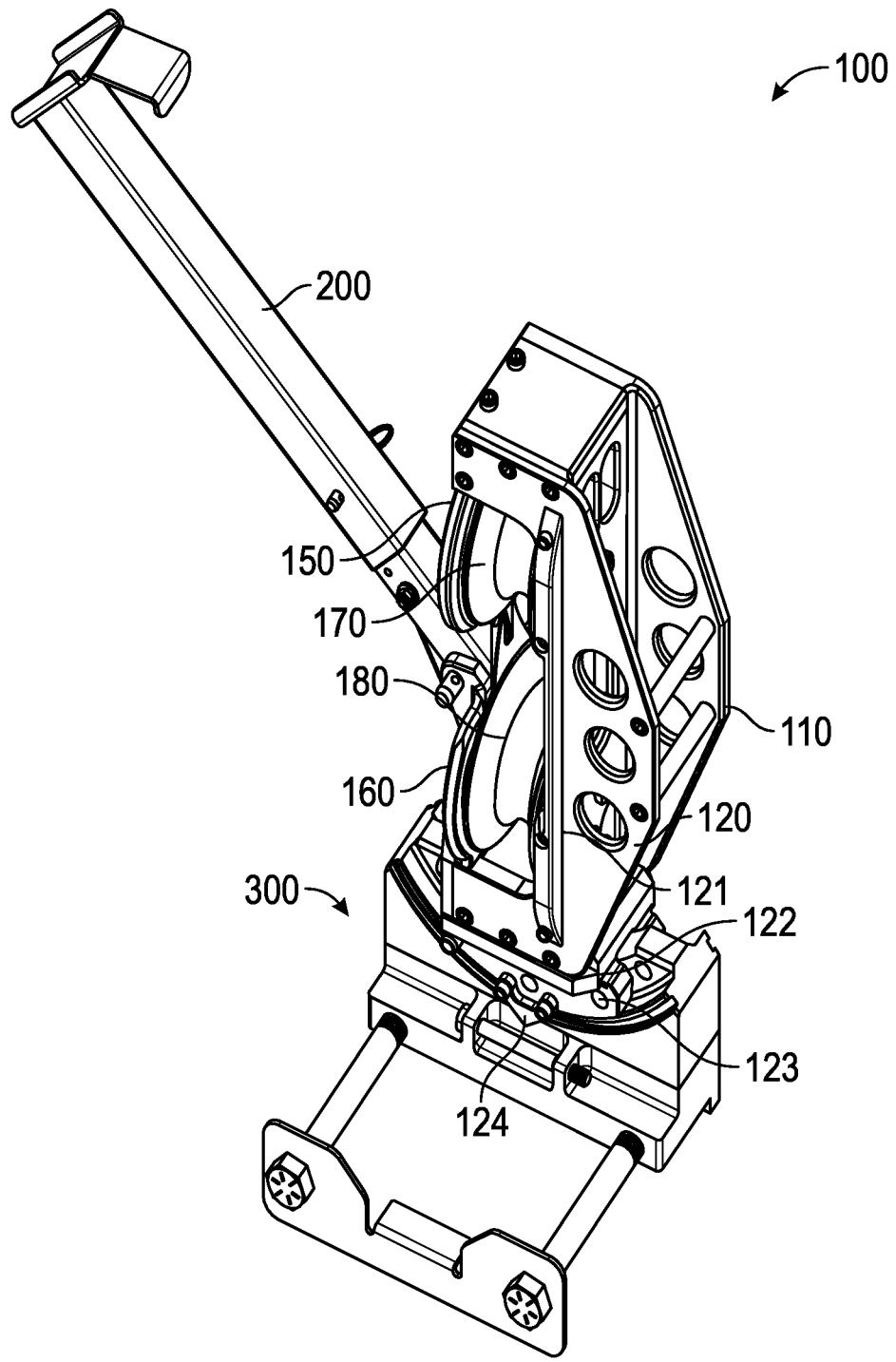
FIG. 5 shows an alternative perspective view of the stringing block system according to the first illustrated embodiment.

FIG. 5 shows an alternative perspective view of the stringing block system (100) according to the first illustrated embodiment. The stringing block system includes a right pivot saddle (123) having a right pivot guide (124) and one or more right pivot saddle apertures (123). The right pivot saddle is coupled to a right mounting plate (120) and configured to rotatably couple to an adjustable base (300). Further coupled to the right mounting plate is a right flange (121). The right mounting plate is shown coupled to a left mounting plate (110) via a plurality of shafts. Additionally, both the right and left mounting plates comprise holes to provide easy grabbing for a lineman.

Figure 6:
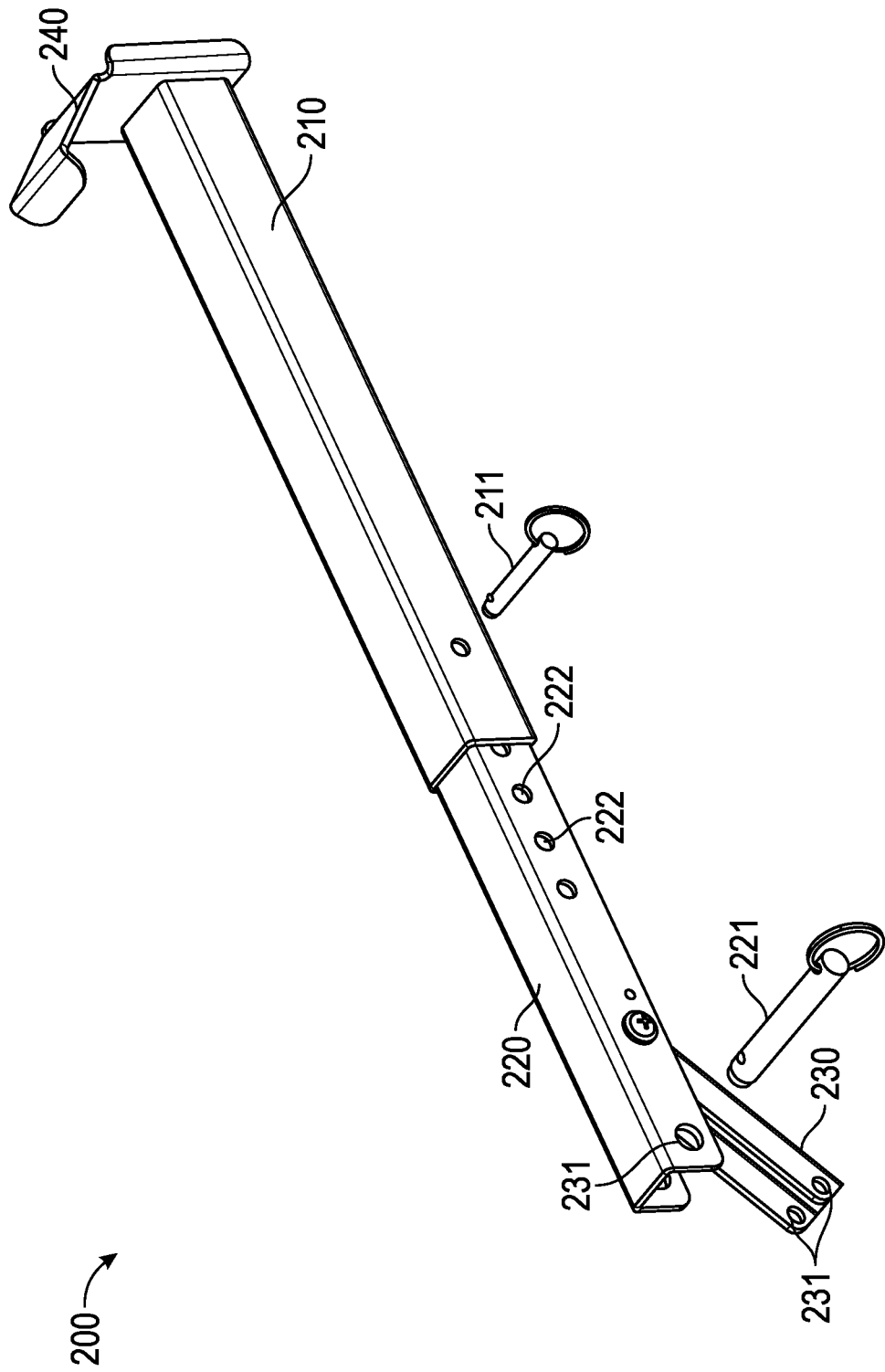
FIG. 6 shows a perspective view of an extendable guide arm according to a second illustrated embodiment.

FIG. 6 shows a perspective view of a guide arm (200) according to a second illustrated embodiment. The guide arm comprises an outer tube (210) coupled to an inner tube (220), wherein the inner tube is configured to nest within the outer tube and configured to translate therewith. The inner tube includes a plurality of circular apertures (222) disposed on each side of the inner tube. Each of the plurality of circular apertures is capable of aligning with an alignment aperture (212) of the outer tube. A first pull pin (211) can be used to pass through both the alignment aperture and one of the plurality of circular apertures, thereby preventing the inner tube from further translation with respect to the outer tube. The guide arm further comprises a guide arm support (230) and attachment points (231) for coupling the guide arm to housing of a stringing block system (FIG. 1, 100). A second pull pin (221) is shown providing a means for said coupling to the stringing block system. Coupled to an end of the of the inner tube is an optional catch arm hook (240). In other embodiments, integrated, retractable pins can protrude through the plurality of circular apertures instead of using an external pull pin.

As shown, the inner tube (220) and outer tube (210) each have a rectangular cross-section. Other cross-sections, such as circular, can also be used to provide similar function.

In some embodiments, the inner tube (220) is coupled to the outer tube (210), and further coupled to the guide arm support (230) such that the outer tube is configured to translate over the inner tube and extend a length of the guide arm. In other embodiments, the inner and outer tubes are reversed such that the outer tube is coupled to the inner tube and further coupled to the guide arm support, thereby configuring the inner tube to translate within the outer tube and extend the length of the guide arm.

Other means of extending the guide arm (200) can also be utilized as appreciated by one having skill in the art, such as, and without limitation, a telescopic arm comprising a plurality of concentrically-disposed portions that are configured to extend and lock into position via friction or threaded means. Other examples may include the guide arm comprising a plurality of segments hingedly coupled together wherein the plurality of segments is capable of unfolding to extend the guide arm.

An angle of orientation of the guide arm (200) with respect to a stringing block system (FIG. 1, 100) will differ depending on particular use, however in a preferable embodiment the angle of orientation comprises around 45 degrees. At 45 degrees, a large area is provided to a pilot for placing a wire on the guide arm while also providing a sufficient gravitational pull to said wire such that the wire is capable of sliding down the guide arm and engaging with the stringing block system.

The guide arm (200) is configured to easily detach from the stringing block system (FIG. 1, 100) in situations where the guide arm is not needed. Detachment of the guide arm can be achieved by removing the second pull pin (221) and any other fasteners engaged with the attachment points (231).

In some embodiments, the guide arm (200) is painted a bright color, such as orange, to aid a pilot in visually identifying where to place the wire. Extending the guide arm will also create a greater surface area for the pilot to make contact with the guide arm which creates a safer and more efficient environment for both the pilot without needing a linesman.

Figure 7:
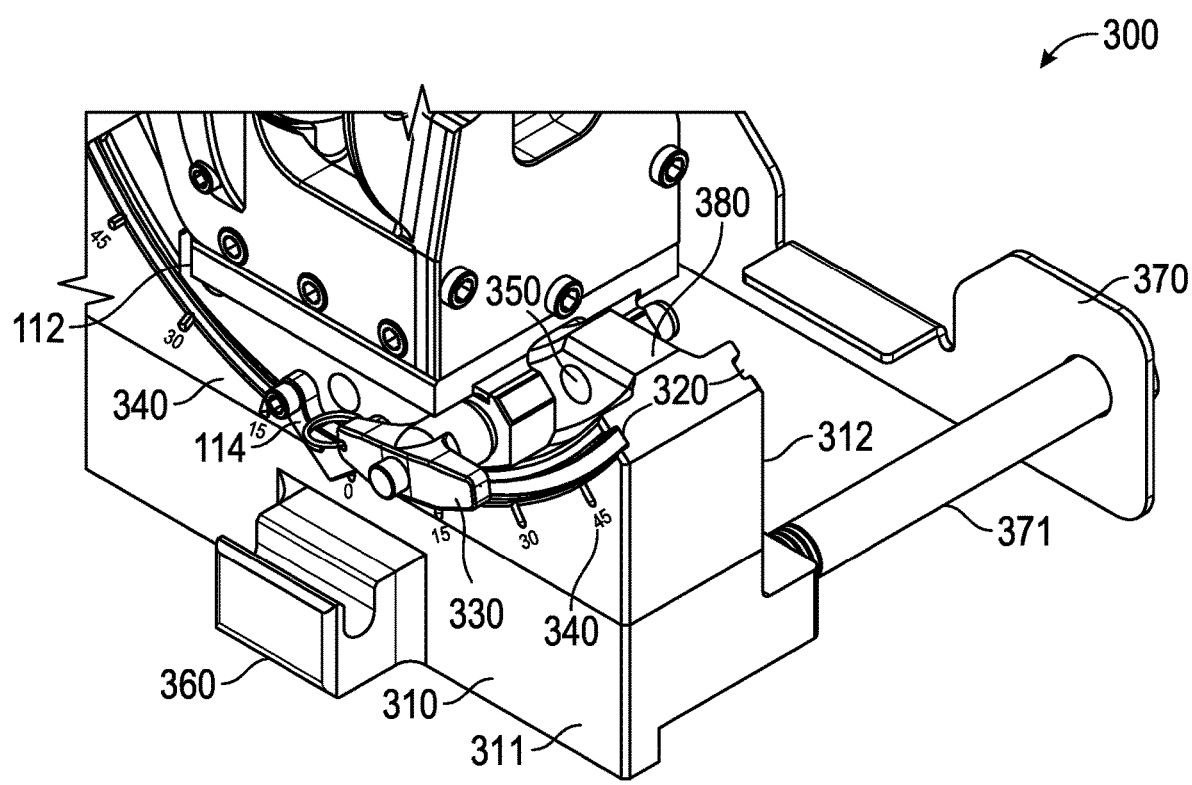
FIG. 7 shows a perspective view of an adjustable base according to a third illustrated embodiment.

FIG. 7 shows a perspective view of an adjustable base (300) according to a third illustrated embodiment. The adjustable base comprises a mount bracket (310), a clamp plate (370), and a plurality of fasteners (371). Disposed on a first side (311) and a second side (312) of the mount bracket near a top portion is a lock slot (320), wherein the lock slot is characterized as having a curved path. The top portion of the mount bracket further comprises a saddle mount (380) having one or more base apertures (350) configured to receive a lock pin (330) such that the lock pin can be inserted through a left pivot saddle aperture (FIG. 2, 113), the base aperture, and a right pivot saddle aperture (FIG. 5, 123), thereby locking a stringing block system (FIG. 1, 100) into place and preventing a left pivot guide (114) and a right pivot guide (FIG. 5, 124) from translating within the respective lock slot.

The mount bracket (310) further comprises angle indicia (340) disposed below the lock slot (320). The angle indicia are associated with a corresponding base aperture (350) to indicate an achieved angle, whether forwards or backwards. As shown, angle increments of fifteen degrees are shown in either direction of a zero position. Fifteen-degree increments is shown in one embodiment, however other embodiments may implement alternative increments.

To attach the adjustable base (300) to a tower, the clamp (370) and fasteners (371) are adjusted to fit a variety of connection points, such as crossarms of a tower. A ratchet strap (not shown) may also be used to add additional strength of attachment to the tower. The mount bracket (310) includes a ratchet strap attachment (360) for coupling a ratchet strap therewith.

Figure 8:
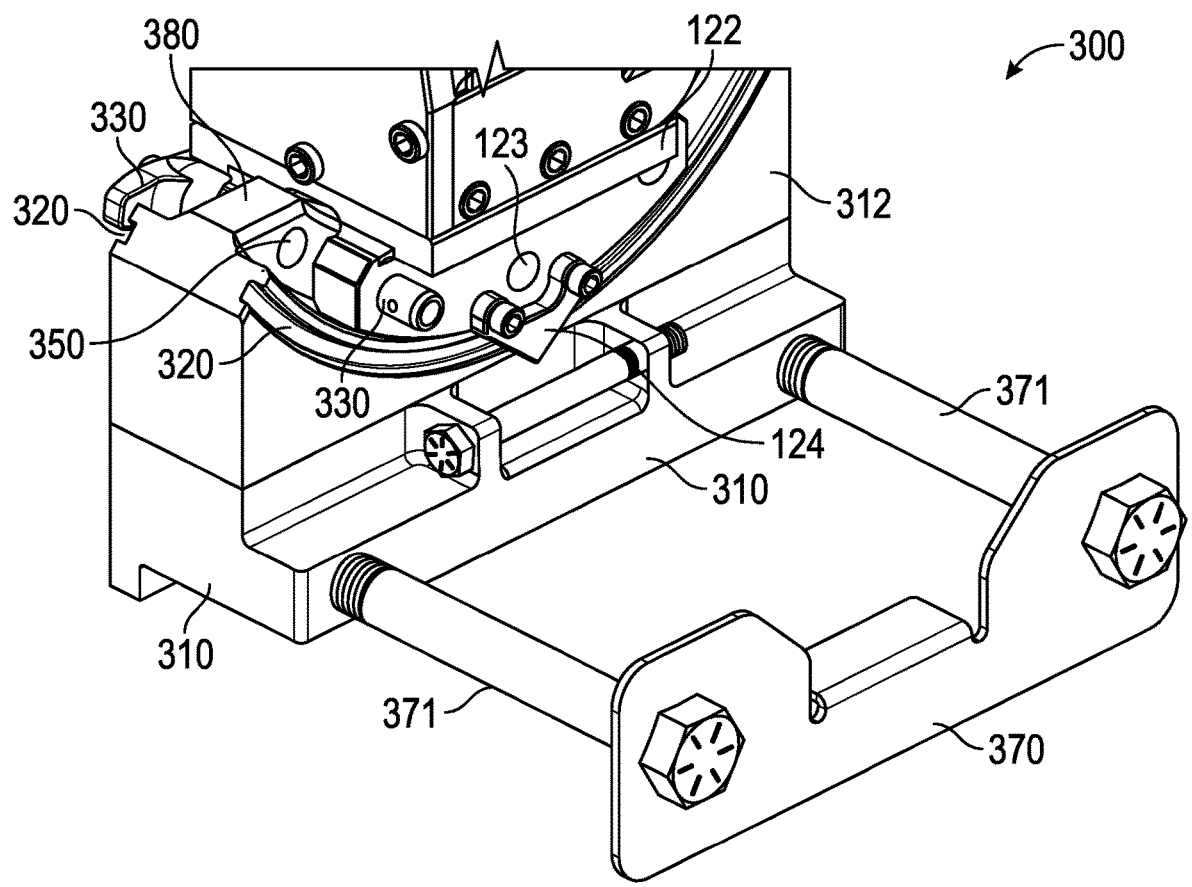
FIG. 8 shows an alternative perspective view of the adjustable base according to the third illustrated embodiment.

FIG. 8 shows an alternative perspective view of the adjustable base (300) according to the third illustrated embodiment. This view shows the front right view of the adjustable base. The adjustable base includes a mount bracket (310), a clamp plate (370) and two fasteners (371) for coupling the adjustable base to a portion of a tower. The mount bracket includes a lock slot (320) wherein a right pivot guide (124) is translationally coupled therewith and configured to rotate about the lock slot to provide a tilt to a right pivot saddle (122). The tilt provided to the right pivot saddle (and additionally a left pivot saddle not shown) causes a stringing block system (FIG. 1, 100) coupled therewith to similarly be titled.

A capability of titling the stringing block system in general is advantageous as it allows a wire passing through the stringing block system at a given tower to be directed to a subsequent tower which is not collinear to the given tower. For example, just as streets have curve and bends to its shape, so would a formation of consecutive towers. If the stringing block system was not capable of tilt, the wire would always prefer a straight direction, and any divergence from the straight direction would be undesirable as the wire would be unable to translate seamlessly through the stringing block system due to the additional friction between the wire and sheave. The adjustable base (300) as shown provides an easy and convenient way of tilling the stringing block system after the stringing block system has been attached to the tower. Normally, a linesman must predict a correct trajectory to a subsequent tower and then attach the stringing block system to the tower. This method provides room for error and may necessitate rework. With the adjustable base as disclosed, the linesman may attach the stringing block system first to a preferred location on the tower and then tilt the stringing block system via the adjustable base. By allowing the wire to articulate directions without having to remove the stringing block system from the tower, both labor cost and safety accidents can be reduced.

A lock pin (330) is shown inserted through a left pivot saddle aperture (not shown), a base aperture (350), and a right pivot saddle aperture (123).

Figure 9:
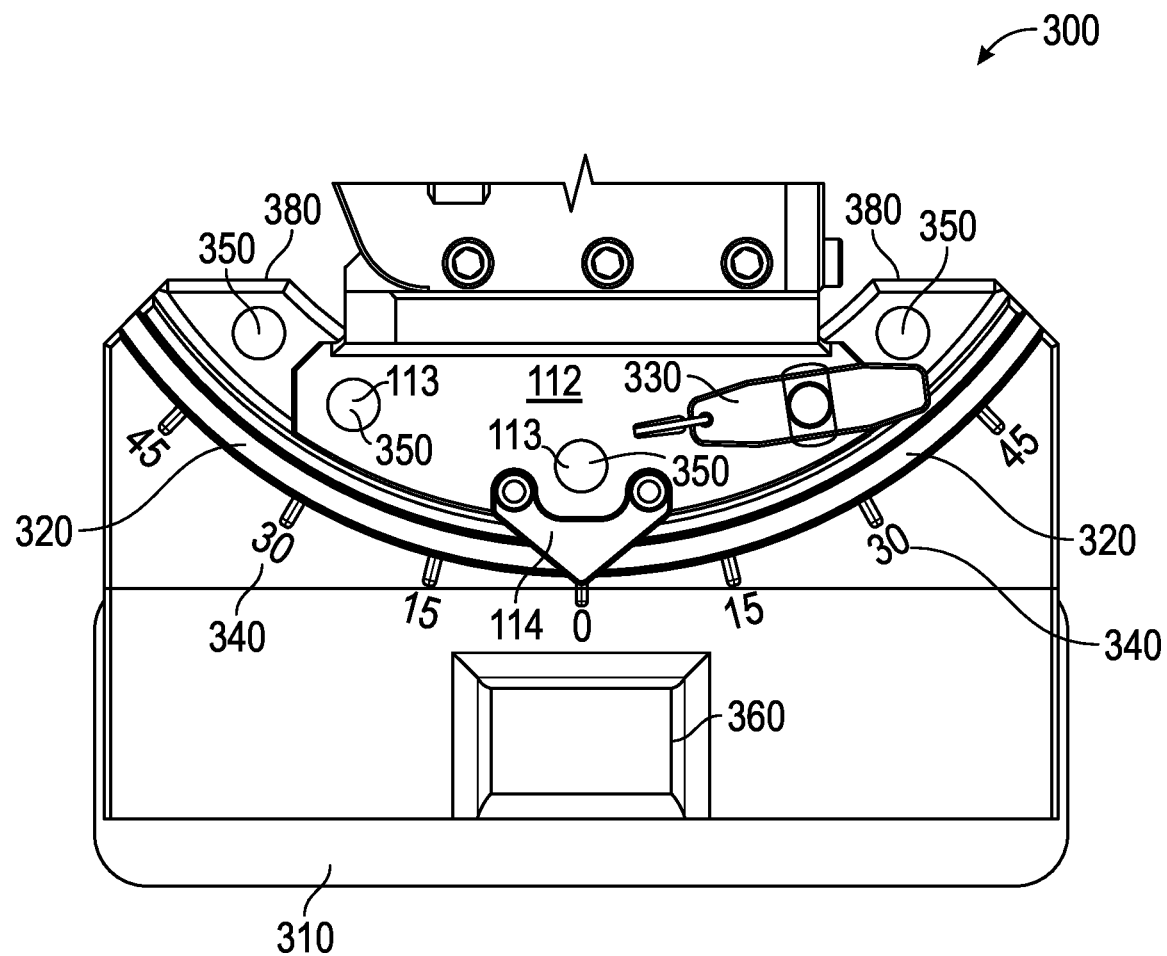
FIG. 9 shows a left view of the adjustable base according to the third illustrated embodiment.

FIG. 9 shows a left view of the adjustable base (300) according to the third illustrated embodiment. The adjustable base comprises a mount bracket (310) having a lock slot (320) and a saddle mount (380) having one or more base apertures (350). The mount bracket further comprises a ratchet strap attachment (360) and angle indicia (340) to indicate position of a stringing block system (FIG. 1, 100).

The lock slot (320) is configured such that a left pivot guide (114), which is attached to a left pivot saddle (112), is capable of translation through the lock slot in either a forwards or backwards direction. The left pivot guide has a stepped portion (not shown) which is in contact with the lock slot to provide, inter alia, a relatively smooth translation through the lock step, by the stepped portion having a surface area allowing it to fit snug with the lock slot. In addition, the lock slot prevents the stepped portion from decoupling therewith, and assists with translation only in directions corresponding to a curvature of the lock slot.

The left pivot saddle (112) comprises one or more left pivot saddle apertures (113). As shown, the left pivot saddle apertures are in alignment with the base apertures (350) and a lick pin (330) is inserted to an aperture which comprises the left pivot saddle aperture, the base aperture, and a right pivot saddle aperture (not shown). It will be appreciated by one having skill in the art that the left and right pivot saddle apertures should be positioned similarly on the left and right pivot saddles such that the lock pin can easily be inserted through both.

Figure 10:
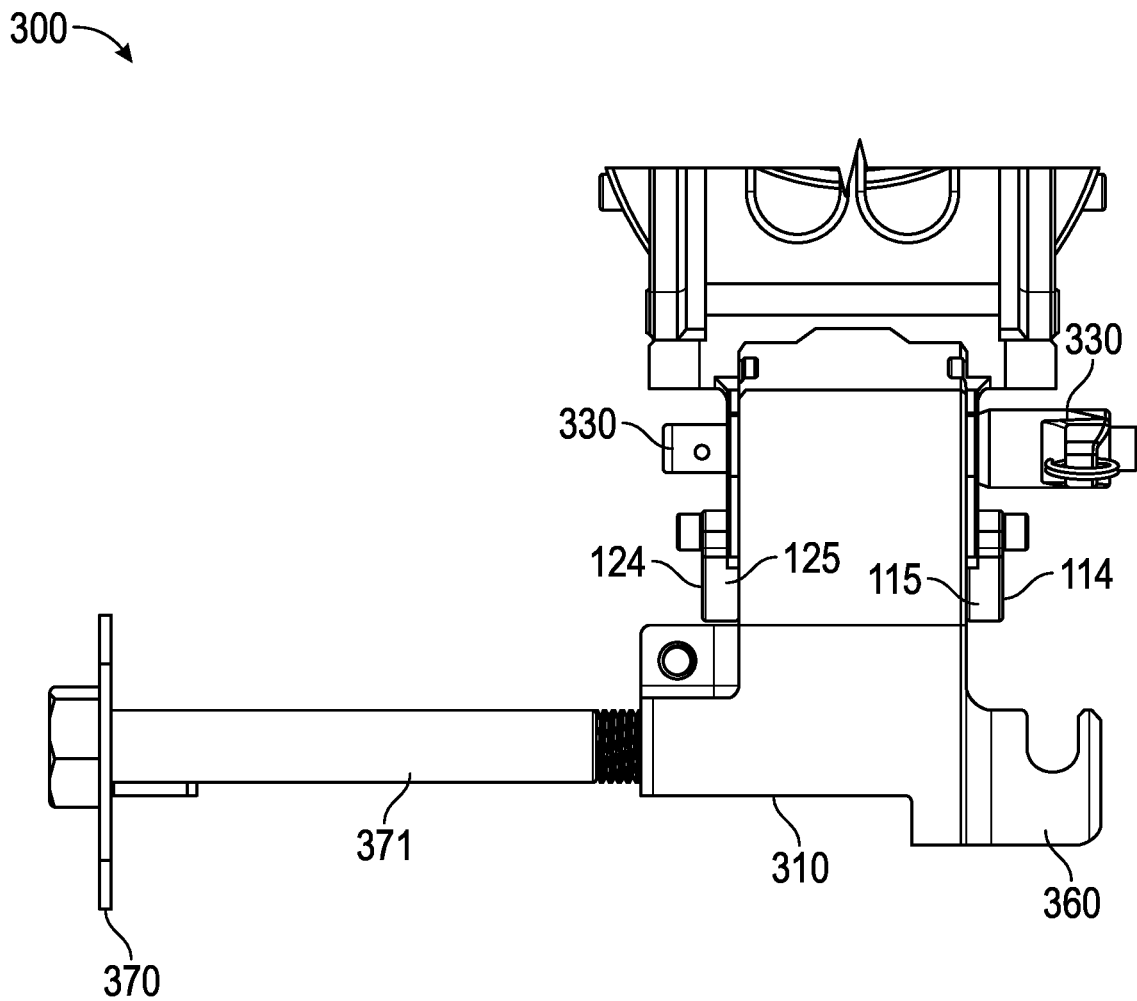
FIG. 10 shows a rear view of the adjustable base according to the third illustrated embodiment.

FIG. 10 shows a rear view of the adjustable base (300) according to the third illustrated embodiment. The adjustable base includes a mount bracket (310), a clamp plate (370), and a fastener (371) coupled to both the mount bracket and clamp plate. A lock pin (330) is shown inserted through the adjustable. A left pivot guide (114) and a right pivot guide (124) are shown coupled to the adjustable base. The left and right pivot guides are coupled to the adjustable base respectively via a left stepped portion (115) and right stepped portion (125). The left and right stepped portions prevent a housing from decoupling from the adjustable base.

Figure 11:
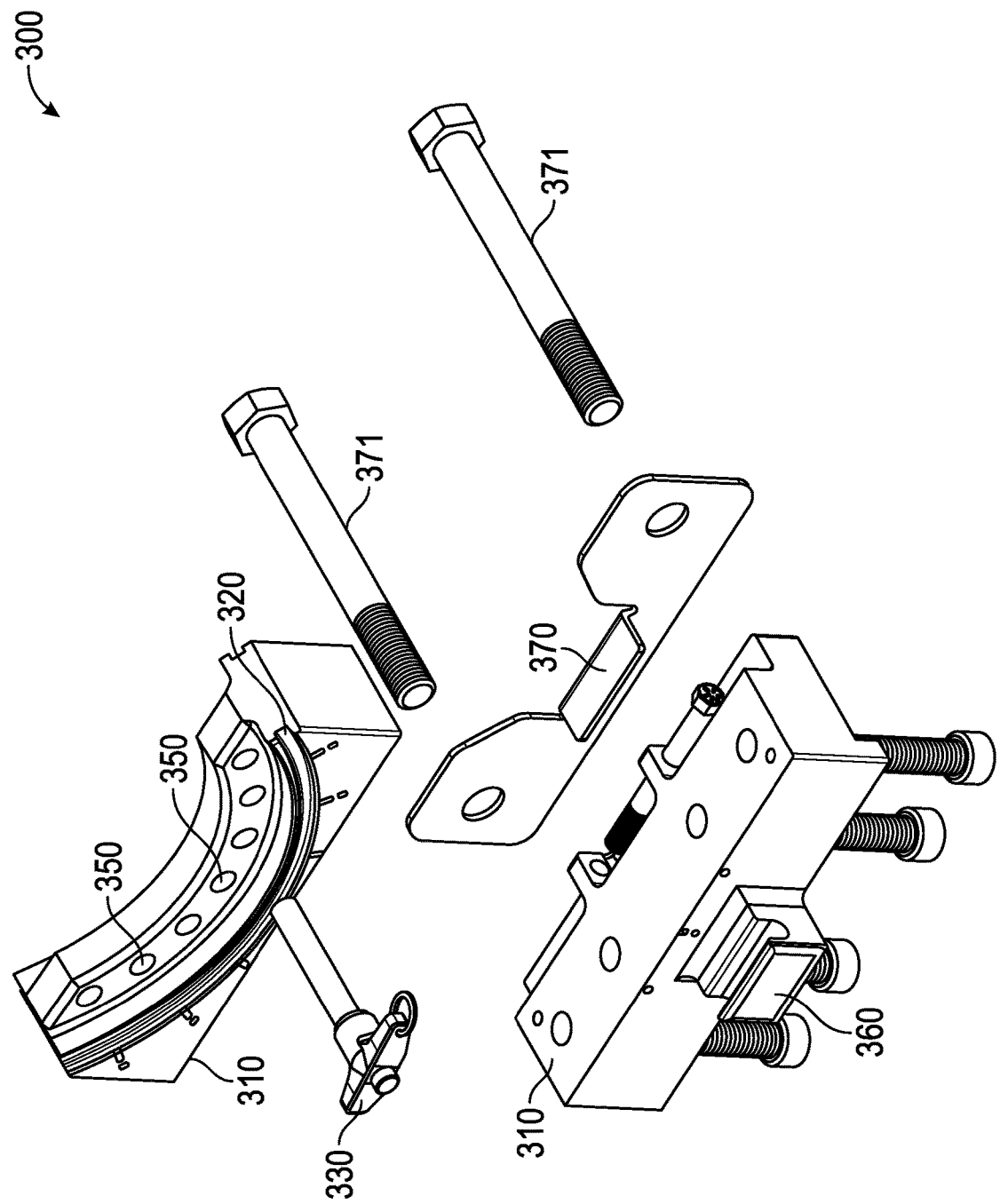
FIG. 11 shows an exploded view of the adjustable base according to the third illustrated embodiment.

FIG. 11 shows an exploded view of the adjustable base (300) according to the third illustrated embodiment. A mount bracket (310) is shown in two sections coupled together via bolts. This is only one example of a method of fabricating the mount bracket and other methods will also be appreciated by one having skill in the art.

Figure 12:
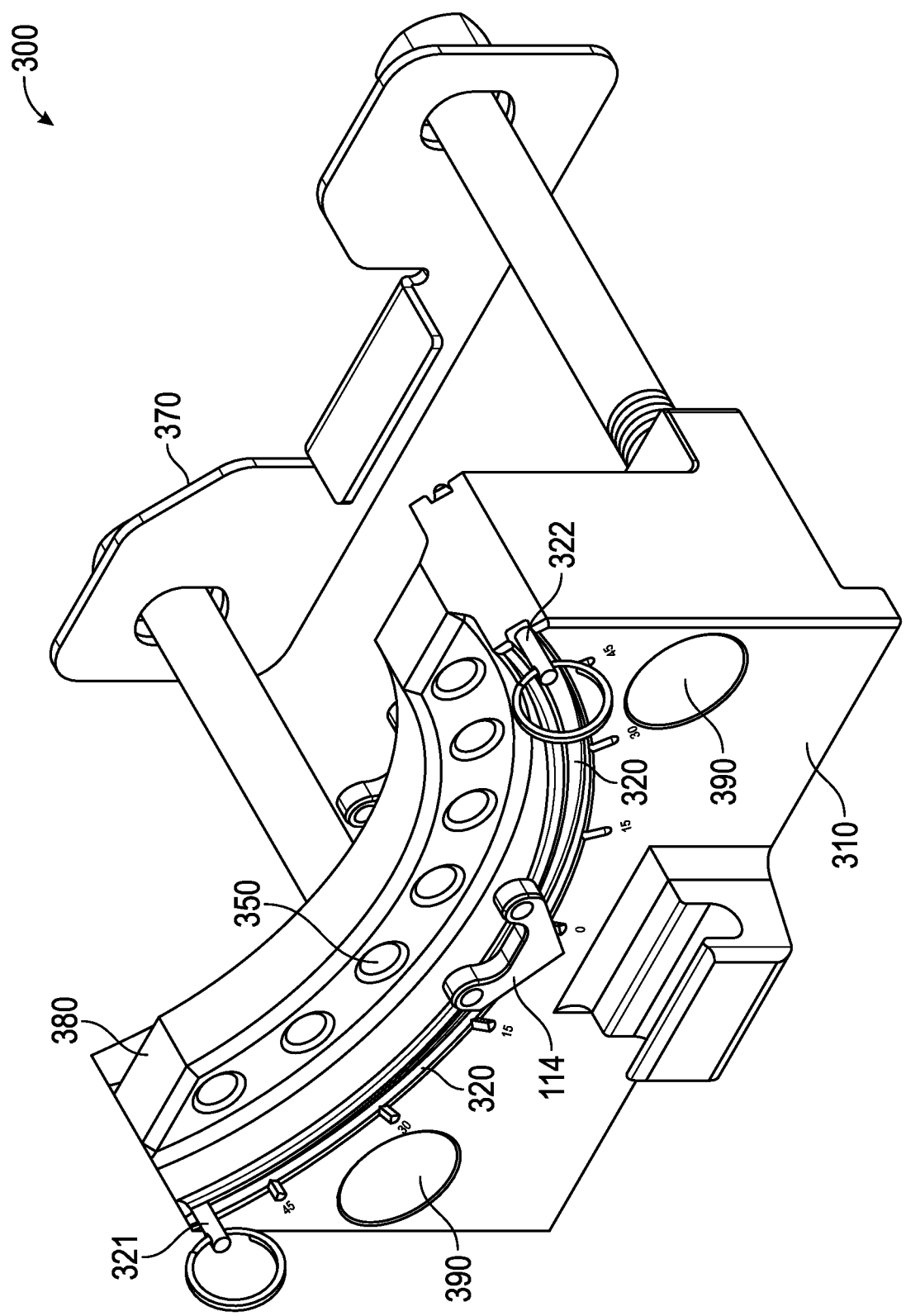
FIG. 12 shows a perspective view of the adjustable base according to a fourth illustrated embodiment.

FIG. 12 shows a perspective view of an adjustable base (300) according to a fourth illustrated embodiment. Here, the adjustable base comprises a mount bracket (310) having weight reducing apertures (390) disposed thereon. The weight reducing apertures reduce weight of the adjustable base by removing material from the mount bracket without reducing strength. This allows for easier transportation of the adjustable base. The adjustable base further comprises a lock slot (320) curving along the mount bracket. Disposed at either end of the lock slot is a first stopper (321) and a second stopper (322). Once to housing has been aligned and guided into the lock slot, the first and second stoppers can be inserted to prevent the housing from accidentally disengaging from the adjustable base. The first and second stoppers can be safety pins as shown, or alternatively be any apparatus or mechanism configured to coupled and decoupled from the ends of the lock slot that can be appreciated by one having skill in the art.

The stringing block system, including the guide arm and adjustable base, can be manufactured from various materials. Preferably, aluminum is used which is both strong and lightweight. However, other kinds of materials may also be utilized. Manufacturing and/or assembly of the stringing block system can be done in according with the conventional knowledge and level of one having skill in the art.

Illustrated embodiments disclosed herein show a stringing block system having two sheaves, namely an upper sheave and lower sheave. In alternative embodiments, the stringing block system has alternative configurations including having a single sheave.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

FEATURE LIST stringing block system (100)
left housing plate (110)
left flange (111)
left pivot saddle (112)
left pivot saddle aperture (113)
left pivot guide (114)
left stepped portion (115)
right housing plate (120)
right flange (121)
right pivot saddle (122)
right pivot saddle aperture (123)
right pivot guide (124)
right stepped portion (125)
top housing plate (130)
rear housing plate (140)
upper mounting plate (150)
upper mounting plate periphery (151)
lower mounting plate (160)
lower mounting plate periphery (161)
upper sheave (170)
upper sheave periphery (171)
lower sheave (180)
lower sheave periphery (181)
side gate (190)
extendable guide arm (200)
outer tube (210)
first pull pin (211)
alignment aperture (212)
inner tube (220)
second pull pin (221)
plurality of circular apertures (222)
guide arm support (230)
attachment points (231)
catch arm hook (240)
adjustable base (300)
mount bracket (310)
first side (311)
second side (312)
lock slot (320)
first stopper (321)
second stopper (322)
lock pin (330)
angle indicia (340)
base aperture (350)
ratchet strap attachment (360)
clamp plate (370)
fastener (371)
saddle mount (380)
weight reducing apertures (390)

What is claimed is:

1. A stringing block system, comprising:
a plurality of plates coupled together to form a housing, the housing including an upper mounting plate and a lower mounting plate;
an upper sheave rotationally coupled to the upper mounting plate, the upper sheave having an upper sheave periphery;
a lower sheave rotationally coupled to the lower mounting plate, the lower sheave having a lower sheave periphery;
a side gate pivotally coupled to the housing, the side gate being configured to pivot towards the upper sheave;
an extendable guide arm coupled to the housing,
the extendable guide arm comprising an outer tube and an inner tube wherein the inner tube is configured to nest with the outer tube;
an adjustable base comprising a mount bracket, a clamp, and a plurality of fasteners disposed therebetween,
the mount bracket comprising:
a first side, a second side opposite the first side, and a top portion, a saddle mount disposed at the top portion, the saddle mount having one or more base apertures,
a lock slot disposed on each of the first side and the second side, the lock slot being charactered as a curved path,
a plurality of indicia disposed on the first side, and
a ratchet strap attachment coupled to the first side;
a left pivot saddle coupled to the housing, the left pivot saddle having a plurality of left pivot saddle apertures;
a right pivot saddle coupled to the housing, the right pivot saddle having a plurality of right pivot saddle apertures;
a left pivot guide coupled to the left pivot saddle, the left pivot guide further comprising a left stepped portion wherein the left stepped portion engages with the lock slot;
a right pivot guide coupled to the right pivot saddle, the right pivot guide further comprising a right stepped portion wherein the right stepped portion engages with the lock slot; and
a lock pin configured to be inserted collectively through one of the one or more base apertures, one of the plurality of left pivot saddle apertures, and one of the plurality of right pivot saddle apertures;
wherein the left and right pivot saddles are configured to rotatably couple with the mount bracket.

2. The stringing block system of claim 1, the upper mounting plate further comprising an upper an upper mounting periphery wherein the upper mounting periphery is greater than the upper sheave periphery.

3. The stringing block system of claim 1, the lower mounting plate further comprising a lower mounting periphery wherein the lower mounting periphery is greater than the lower sheave periphery.

4. The stringing block system of claim 1, the housing further comprising:
a left housing plate;
a right housing plate oriented parallel with the left housing plate and spaced apart therefrom;
a left flange coupled to the left housing plate; and
a right flange coupled to the right housing plate;
wherein the left and right flanges are configured to protect the upper sheave.

5. A stringing block system, comprising:
a plurality of plates coupled together to form a housing;
an upper sheave rotationally coupled to the housing, the upper sheave having an upper sheave periphery;
a side gate pivotally coupled to the housing, the side gate being configured to pivot towards the upper sheave;
an extendable guide arm coupled to the housing; and
an adjustable base;
wherein the housing is rotatably coupled to the adjustable base.

6. The stringing block system of claim 5, the extendable guide arm further comprising an outer tube and an inner tube wherein the inner tube is configured to nest within the outer tube.

7. The stringing block system of claim 5, the housing further comprising an upper mounting plate coupled to the upper sheave, the upper mounting plate comprising an upper mounting periphery wherein the upper mounting periphery is greater than the upper sheave periphery.

8. The stringing block system of claim 5, the system further comprising a lower sheave having a lower sheave periphery disposed below the upper sheave, wherein the lower sheave is rotationally coupled to the housing.

9. The stringing block system of claim 8, the housing further comprising a lower mounting plate coupled to the lower sheave, the lower mounting plate comprising a lower mounting periphery wherein the lower mounting periphery is greater than the lower sheave periphery.

10. The stringing block system of claim 5, the housing further comprising:
a left housing plate;
a right housing plate oriented parallel with the left housing plate and spaced apart therefrom;
a left flange coupled to the left housing plate; and
a right flange coupled to the right housing plate;
wherein the left and right flanges are configured to protect the upper sheave.

11. The stringing block system of claim 5, the adjustable base further comprising a mount bracket, a clamp plate, and a plurality of fasteners disposed therebetween.

12. The stringing block system of claim 5, the adjustable base further comprising a lock slot, the lock slot characterized as having a curved path.

13. The stringing block system of claim 5, the adjustable base further comprising a plurality of angle of indicia.

14. The stringing block system of claim 5, the adjustable base further comprising a saddle mount, the saddle mount having one or more base apertures.

15. The stringing block system of claim 14, the system further comprising:
a left pivot saddle having a plurality of left pivot saddle apertures, the left pivot saddle being coupled to the housing; and
a right pivot saddle having a plurality of right pivot saddle apertures, the right pivot saddle being coupled to the housing;
wherein the left and right pivot saddles are configured to rotatably couple with the adjustable base.

16. The stringing block system of claim 15, the system further comprising a lock pin configured to be inserted collectively through one of the one or more base apertures, one of the plurality of left pivot saddle apertures, and one of the plurality of right pivot saddle apertures.

17. The stringing block system of claim 15, the system further comprising:
a left pivot guide coupled to the left pivot saddle; and
a right pivot guide coupled to the right pivot saddle;
wherein the right and left pivot guides are configured to slideably engage with a lock slot.

18. The stringing block system of claim 16, the system further comprising:
a left stepped portion disposed on the left pivot guide; and
a right stepped portion disposed on the right pivot guide;
wherein the right and left stepped portions are configured to prevent the housing from decoupling from the adjustable base.

* * * * *